(12) United States Patent
Koizumi et al.

(10) Patent No.: US 11,609,115 B2
(45) Date of Patent: Mar. 21, 2023

(54) ANOMALOUS SOUND DETECTION APPARATUS, DEGREE-OF-ANOMALY CALCULATION APPARATUS, ANOMALOUS SOUND GENERATION APPARATUS, ANOMALOUS SOUND DETECTION TRAINING APPARATUS, ANOMALOUS SIGNAL DETECTION APPARATUS, ANOMALOUS SIGNAL DETECTION TRAINING APPARATUS, AND METHODS AND PROGRAMS THEREFOR

(71) Applicant: NIPPON TELEGRAPH AND TELEPHONE CORPORATION, Chiyoda-ku (JP)

(72) Inventors: Yuma Koizumi, Musashino (JP); Shoichiro Saito, Musashino (JP); Hisashi Uematsu, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 770 days.

(21) Appl. No.: 16/485,334

(22) PCT Filed: Sep. 14, 2017

(86) PCT No.: PCT/JP2017/033275
§ 371 (c)(1),
(2) Date: Aug. 12, 2019

(87) PCT Pub. No.: WO2018/150616
PCT Pub. Date: Aug. 23, 2018

(65) Prior Publication Data
US 2019/0376840 A1 Dec. 12, 2019

(30) Foreign Application Priority Data
Feb. 15, 2017 (JP) .............................. JP2017-025865

(51) Int. Cl.
*G01H 17/00* (2006.01)
*G01N 29/52* (2006.01)
(Continued)

(52) U.S. Cl.
CPC ............. *G01H 17/00* (2013.01); *G01N 29/52* (2013.01); *G10L 25/03* (2013.01); *G10L 25/51* (2013.01)

(58) Field of Classification Search
CPC ...................................................... G01H 17/00
See application file for complete search history.

(56) References Cited

U.S. PATENT DOCUMENTS

2009/0106174 A1* 4/2009 Battisha ................. H04L 43/00
706/12
2013/0148817 A1* 6/2013 Moriya ................... H04R 29/00
381/56

(Continued)

OTHER PUBLICATIONS

International Search Report dated Dec. 5, 2017 in PCT/JP2017/033275 filed Sep. 14, 2017.

(Continued)

*Primary Examiner* — Bryan S Blankenagel
(74) *Attorney, Agent, or Firm* — Oblon, McClelland, Maier & Neustadt, L.L.P.

(57) ABSTRACT

To provide an anomalous sound detection training technique by which a feature amount extraction function for detecting anomalous sound can be generated irrespective of whether training data for anomalous signals is available or not. An anomalous sound detection training apparatus includes: a first function updating unit 3 that updates a feature amount extraction function and an feature amount inverse transformation function, which are input, based on an optimization index of a variational autoencoder; an acoustic feature extraction unit 4 that extracts an acoustic feature of normal sound based on training data for normal sound; a normal (Continued)

sound model updating unit 5 that updates a normal sound model by using the acoustic feature that is extracted; a threshold updating unit 6 that obtains a threshold $\varphi_\rho$ corresponding to a false positive rate $\rho$, which has a predetermined value, by using the training data for normal sound and the feature amount extraction function that is input; and a second function updating unit 8 that updates the feature amount extraction function that is updated, based on a Neyman-Pearson-type optimization index defined by the threshold $\varphi_\rho$ that is obtained, and repeatedly performs processing of each of the above-mentioned units.

20 Claims, 7 Drawing Sheets

(51) Int. Cl.
  *G10L 25/03* (2013.01)
  *G10L 25/51* (2013.01)

(56) References Cited

U.S. PATENT DOCUMENTS

| | | | |
|---|---|---|---|
| 2014/0276229 A1* | 9/2014 | Ikeda | A61B 5/7257 600/586 |
| 2015/0219530 A1 | 8/2015 | Li et al. | |
| 2015/0242754 A1* | 8/2015 | Fukuda | G06N 20/00 706/12 |
| 2017/0103776 A1* | 4/2017 | Kim | G10L 25/24 |
| 2019/0243872 A1* | 8/2019 | Komatsu | G06N 7/00 |

OTHER PUBLICATIONS

Ide, T. et al. "Anomaly Detection and Change Detection," Kodanasha, Aug. 7, 2015, pp. 6-7 (5 pages total, with partial English translation).

Neyman, J. et al., "On the Problem of the Most Efficient Tests of Statistical Hypotheses," Philosophical Transactions of the Royal Society of London, Series A, Containing Papers of a Mathematical or Physical Character, vol. 231, 1933, pp. 289-337 (50 pages total).

Kingma, D. P. et al., "Auto-Encoding Variational Bayes," Proceedings of the International Conference on Learning Representations (ICLR), 2014, pp. 1-14.

Konishi, S. "Introduction to Multivariate Analysis, Appendix C: EM algorithm," Iwanami Shoten, Jan. 26, 2010, pp. 294-298 (7 pages total, with partial English translation).

Koizumi et al., "Automatic Design of Acoustic Features for Detecting Abnormal Sounds in Machine Operation Sounds", CD-ROM of Proceedings of the 2016 Autumn Meeting of the Acoustical Society of Japan, XP009515527, Aug. 31, 2016, pp. 365-368 (with English Translation).

Erik Marchi et al., "A Novel Approach for Automatic Acoustic Novelty Detection Using a Denoising Autoencoder with Bidirectional LSTM Neural Networks", XP33187110, 2015 IEEE, pp. 1996-2000.

Abhijeet Sangwan et al., "Environmentally Aware Voice Activity Detector", Interspeech 2007, XP55779570, pp. 2929-2932.

\* cited by examiner

ANOMALOUS SOUND DETECTION APPARATUS, DEGREE-OF-ANOMALY CALCULATION APPARATUS, ANOMALOUS SOUND GENERATION APPARATUS, ANOMALOUS SOUND DETECTION TRAINING APPARATUS, ANOMALOUS SIGNAL DETECTION APPARATUS, ANOMALOUS SIGNAL DETECTION TRAINING APPARATUS, AND METHODS AND PROGRAMS THEREFOR

TECHNICAL FIELD

The present invention relates to training techniques for detecting anomalous waves of anomalous sound or the like from signals such as a sound signal.

BACKGROUND ART

In a factory or the like, even a shutdown of an industrial device installed therein, such as a large-sized manufacturing or molding machine, due to a failure significantly hinders the factory's operation. It is thus necessary to routinely monitor the operational status of the device and immediately take measures in the event of an anomaly. One solution is to regularly dispatch a maintenance person to the field from an industrial device management service to check machine components for wear and the like. Since this requires enormous personnel and/or traveling costs and labor, however, it is difficult to implement this on all industrial devices and/or factories.

A solution to this is to install a microphone inside a machine so as to routinely monitor the operational sound of the machine. Through analysis of the operational sound, any occurrence of sound that is likely to be an anomaly (i.e., anomalous sound) is detected and an alert is raised, thereby solving the anomaly. However, setting the types of anomalous sound and/or methods for detecting them for every machine type or individual unit is even more expensive than manual monitoring. Thus, there is a need for automated design of rules for automatically detecting anomalous sound.

As a way to address this problem, anomalous sound detection based on statistical approaches is well known (see Non-patent Literature 1, for instance). Anomalous sound detection based on statistical approaches is generally classified into supervised anomalous sound detection and unsupervised anomalous sound detection. In supervised anomalous sound detection, a classifier is trained from training data for normal sound and anomalous sound; whereas in unsupervised anomalous sound detection, a classifier is trained only from training data for normal sound. For an industrial application, unsupervised anomalous sound detection is often used because training data for anomalous sound is difficult to collect.

A training/detection flow for unsupervised anomalous sound detection is as shown in FIG. 7. During training, an acoustic feature obtained from sound data (training data) at the time of normal operation is extracted. Thereafter, a normal sound model (a probability density function) is trained from the acoustic feature. Then, during determination, an acoustic feature is extracted in relation to a newly obtained observation, and a negative logarithmic likelihood (i.e., degree of anomaly) is evaluated against an already trained normal sound model. If the value is smaller than a threshold, it is determined to be normal; and if the value is larger than the threshold, it is determined to be anomalous.

In other words, this is evaluation of how well an observed sound fits the normal sound model. It is based on the idea that sound "resembling" training data for normal sound should be produced if the observation represents normal sound and sound "not resembling" the training data for normal sound should be produced if the observation represents anomalous.

Description based on formulas is provided so as to further embody FIG. 7. The issue of anomalous sound detection is an issue for determining whether an observation signal $X_{\omega,\tau} \in C^{\Omega \times T}$ is normal or anomalous. Here, $\omega \in \{1, \ldots, \Omega\}$ and $\tau \in \{1, \ldots, T\}$ are indices of frequency and time respectively.

An acoustic feature $f_\tau \in R^D$ is first extracted from an observation signal.

$$f_\tau = F(x_\tau) \tag{1}$$

Here, F represents a feature amount extraction function. Further, $x_\tau$ represents a vector in which a plurality of $X_{\omega,\tau}$ required for extracting an acoustic feature are lined up and is set as the following, for example.

$$x_\tau = (X_{\tau-P_b}, X_{\tau-P_b+1}, X_{\tau+P_f})^T \tag{2}$$

$$X_\tau = (X_{1,\tau}, X_{2,\tau}, \ldots, X_{\Omega,\tau}) \tag{3}$$

Here, T represents transposition. $P_b$ and $P_f$ respectively represent the number of past frames and the number of future frames included in $x_\tau$. For example, approximately $P_b = P_f = 5$ is set.

Next, a degree of anomaly $L(f_\tau)$ is calculated as follows.

$$L(f_\tau) = -\ln p(f_\tau | z=0) \tag{4}$$

Here, $p(f_\tau | z=0)$ represents a normal sound model. Further, z is an indicator which becomes z=0 when $X_{\omega,\tau}$ represents normal sound and becomes z≠0 when $X_{\omega,\tau}$ represents anomalous sound. At the end, if a value of $L(f_\tau)$ is greater than a threshold φ, it is determined to be anomalous; and if the value of $L(f_\tau)$ is smaller than the threshold φ, it is determined to be normal.

$$\hat{R}_\tau = H(L(f_\tau), \varphi) = \begin{cases} 0 \text{ (normal)} & L(f_\tau) \leq \varphi \\ 1 \text{ (abnormal)} & L(f_\tau) > \varphi \end{cases} \tag{5}$$

Here, $H(L_\tau, \varphi)$ represents an anomalous determination function.

PRIOR ART LITERATURE

Non-Patent Literature

Non-patent Literature 1: Tsuyoshi Ide and Masashi Sugiyama, "Anomaly Detection and Change Detection", Kodansha, pp. 6-7, 2015.

SUMMARY OF THE INVENTION

Problems to be Solved by the Invention

A challenge in unsupervised anomaly detection is design of a feature amount extraction function F(•). In supervised anomalous sound detection, an acoustic feature that can correctly identify a target of determination is manually designed. For example, if it is known that the normal sound is a sinusoidal wave of 1000 Hz and the anomalous sound is a sinusoidal wave of 2000 Hz, a log power of a Mel filter bank (log-MFB0) is extracted per frame because the two sounds have different tone timbres. If the normal sound is steady engine noise and the anomalous sound is a "bumping" sound produced by hitting of devices, a temporal difference of the power of a Mel filter bank (ΔMFBO) is extracted because the anomalous sound is a sporadic sound. "Deep training", a type of supervised training, is said to be able to automatically design an acoustic feature from training data.

In unsupervised anomaly detection, however, it cannot be known anomalous sound with what kind of sound characteristics will occur. It is accordingly hard to manually design the feature amount extraction function and use of deep training is also difficult. For example, if the anomalous sound is assumed to be a sinusoidal wave of 2000 Hz and log-MFBO is used as the acoustic feature due to the fact that the normal sound was a sinusoidal wave of 1000 Hz, anomalous sound like a "bumping" sound produced by hitting of devices cannot be detected. The opposite is also true. This has forced use of, for example, Mel filter bank cepstrum coefficient (MFCC), which is a general-purpose sound feature amount, resulting in low accuracy of detection compared to supervised training.

An object of the present invention is to provide an anomalous sound detection training apparatus that is capable of generating a feature amount extraction function for anomalous signal detection irrespective of whether training data for anomalous signals is available or not; an anomalous sound detection apparatus, a degree-of-anomaly calculation apparatus, an anomalous sound generation apparatus, an anomalous sound detection training apparatus, an anomalous signal detection apparatus, and an anomalous signal detection training apparatus that use the feature amount extraction function; and methods and programs therefor.

Means to Solve the Problems

An anomalous sound detection apparatus according to an aspect of the present invention is an anomalous sound detection apparatus that detects whether or not input sound, which is input, is anomalous sound and includes: an acoustic feature extraction unit that extracts an acoustic feature of the input sound by using a feature amount extraction function; a degree-of-anomaly calculation unit that calculates a degree of anomaly of the input sound by using the acoustic feature that is extracted; and a determination unit that determines whether or not the input sound is anomalous sound based on the degree of anomaly that is obtained and a threshold. The feature amount extraction function is based on probability distribution modeling sound which can include normal sound and anomalous sound, probability distribution modeling normal sound, and probability distribution modeling anomalous sound that is input, and the threshold is set by using degrees of anomaly obtained from the normal sound.

A degree-of-anomaly calculation apparatus according to another aspect of the present invention is a degree-of-anomaly calculation apparatus that calculates a degree of anomaly of input sound, which is input, so as to detect whether or not the input sound is anomalous sound and includes: an acoustic feature extraction unit that extracts an acoustic feature of the input sound by using a feature amount extraction function; and a degree-of-anomaly calculation unit that calculates a degree of anomaly of the input sound by using the acoustic feature that is extracted. The feature amount extraction function is based on probability distribution modeling sound which can include normal sound and anomalous sound, probability distribution modeling normal sound, and probability distribution modeling anomalous sound that is input, and the threshold is set by using degrees of anomaly obtained from the normal sound.

An anomalous sound generation apparatus according to still another aspect of the present invention is an anomalous sound generation apparatus that generates anomalous sound based on sound which can include normal sound and anomalous sound and includes an anomalous sound generation unit that generates anomalous sound by using probability distribution modeling the sound which can include normal sound and anomalous sound, the feature amount inverse transformation function, which is an inverse function of the feature amount extraction function, and a threshold. The feature amount inverse transformation function is an inverse transformation function of a feature amount transformation function that is based on the probability distribution modeling the sound which can include normal sound and anomalous sound, probability distribution modeling normal sound, and probability distribution modeling anomalous sound that is input, and the threshold is set by using degrees of anomaly obtained from the normal sound.

An anomalous sound detection training apparatus according to yet another aspect of the present invention includes: a first function updating unit that updates a feature amount extraction function and an feature amount inverse transformation function, which are input, based on an optimization index of a variational autoencoder; an acoustic feature extraction unit that extracts an acoustic feature of normal sound based on training data for normal sound by using the feature amount extraction function that is input; a normal sound model updating unit that updates a normal sound model by using the acoustic feature that is extracted; a threshold updating unit that obtains a threshold $\varphi_\rho$ corresponding to a false positive rate $\rho$, which has a predetermined value, by using the training data for normal sound and the feature amount extraction function that is input; and a second function updating unit that updates the feature amount extraction function that is updated, based on a Neyman-Pearson-type optimization index defined by the threshold $\varphi_\rho$ that is obtained, by using the acoustic feature of normal sound that is extracted and an acoustic feature of anomalous sound that is input. The anomalous sound detection training apparatus repeatedly performs processing of the first function updating unit, processing of the acoustic feature extraction unit, processing of the normal sound model updating unit, and processing of the second function updating unit by using the feature amount extraction function, which is updated by the second function updating unit, as an input.

An anomalous signal detection apparatus according to yet another aspect of the present invention is an anomalous signal detection apparatus that detects whether or not an input signal, which is input, is an anomalous signal and includes: a feature amount extraction unit that extracts a feature amount of the input signal by using a feature amount extraction function; a degree-of-anomaly calculation unit that calculates a degree of anomaly of the input signal by using the feature amount that is extracted; and a determination unit that determines whether or not the input signal is an anomalous signal based on the degree of anomaly that is obtained and a threshold. The feature amount extraction function is based on probability distribution modeling signals which can include a normal signal and an anomalous signal, probability distribution modeling normal signals, and probability distribution modeling anomalous signals that are input, and the threshold is set by using degrees of anomaly obtained from the normal signal.

An anomalous signal detection training apparatus according to yet another aspect of the present invention includes: a first function updating unit that updates a feature amount extraction function and an feature amount inverse transformation function, which are input, based on an optimization index of a variational autoencoder; a feature amount extraction unit that extracts a feature amount of a normal signal based on training data for normal signals by using the feature amount extraction function that is input; a normal signal model updating unit that updates a normal signal model by using the feature amount that is extracted; a threshold updating unit that obtains a threshold $\varphi_\rho$ corresponding to a false positive rate $\rho$, which has a predetermined value, by using the training data for normal signals and the feature amount extraction function that is input; and a second function updating unit that updates the feature amount extraction function that is updated, based on a Neyman-Pearson-type optimization index defined by the threshold $\varphi_\rho$ that is obtained, by using the feature amount of a normal signal that is extracted and a feature amount of an anomalous signal that is input. The anomalous signal detection training apparatus repeatedly performs processing of the first function updating unit, processing of the feature amount extraction unit, processing of the normal signal model updating unit, and processing of the second function updating unit by using the feature amount extraction function, which is updated by the second function updating unit, as an input.

Effects of the Invention

A feature amount extraction function for anomalous signal detection can be generated irrespective of whether training data for anomalous signals is available or not. Further, anomalous sound detection, degree-of-anomaly calculation, anomalous sound generation, anomalous sound detection training, anomalous signal detection, and anomalous signal detection training can be performed by using this feature amount extraction function.

DETAILED DESCRIPTION OF THE EMBODIMENTS

Technical Background (Neyman-Pearson-Type Optimization Index)

Figure 1:
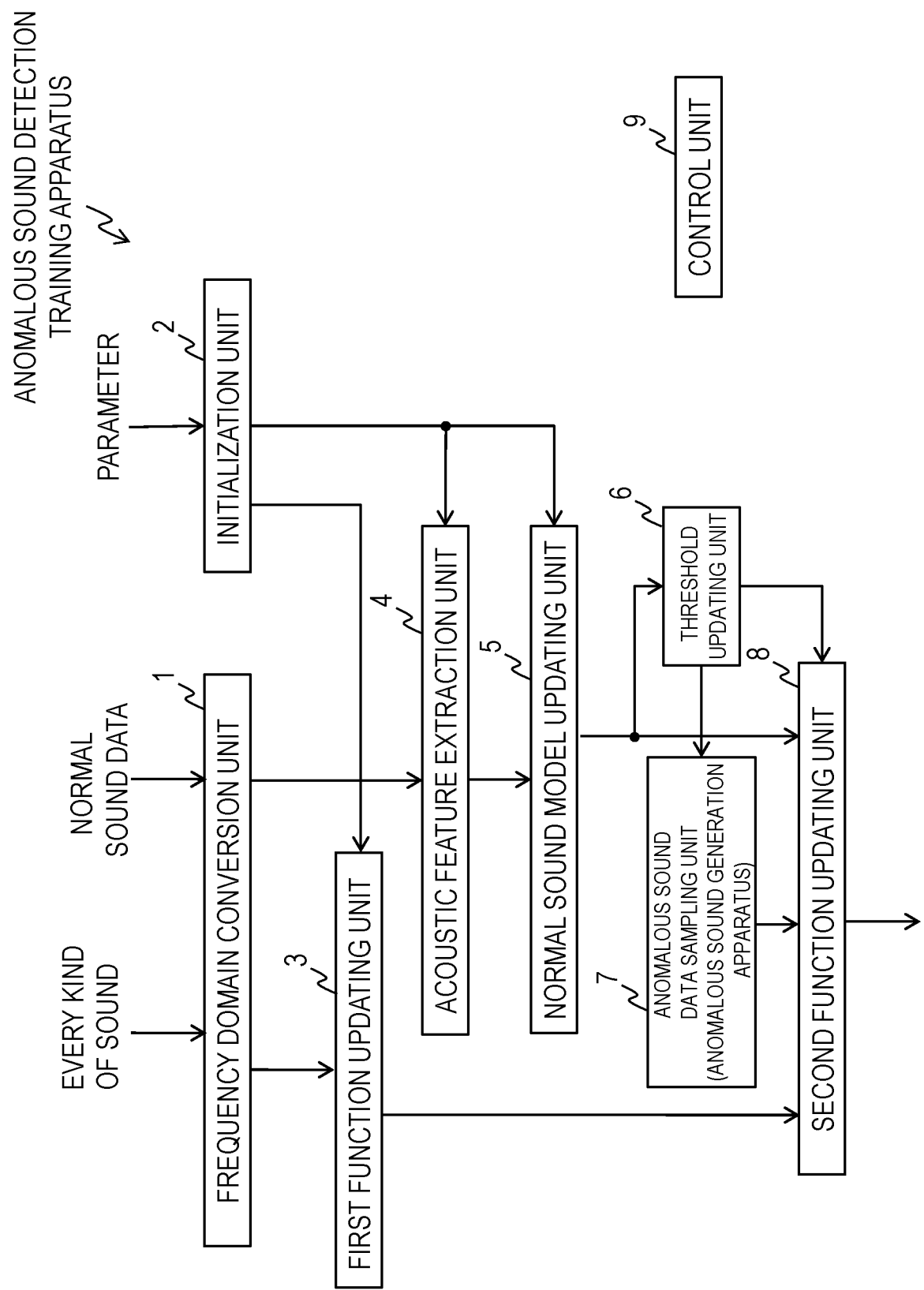
FIG. 1 is a block diagram for describing an example of an anomalous sound detection training apparatus.

Unsupervised anomalous sound detection can be considered as a kind of hypothesis testing using null hypothesis and alternative hypothesis described below.

Null hypothesis: $x_\tau$ is a sample generated from $p(x|z=0)$.

Alternative hypothesis: $x_\tau$ is not a sample generated from $p(x|z=0)$.

Accordingly, it can be considered that an anomalous sound detection rate can be maximized by optimizing a feature amount extraction function in accordance with the theory of the hypothesis testing.

According to the Neyman Pearson theorem (see Reference Literature 1, for instance), it is known that the most powerful hypothesis testing function is a function which maximizes a true positive rate (TPR) when a false positive rate (FPR) is set as p. Here, a FPR and a TPR can be calculated by the following formulas. A false positive rate is a probability that normal sound is incorrectly detected as anomalous sound. On the other hand, a true positive rate is a probability that anomalous sound is detected as anomalous sound. A false positive rate and a true positive rate are also referred to as an error detection rate.

$$FPR(F,\phi)=\int H(L(F(x)),\phi)p(F(x),x|z=0)dx \qquad (6)$$

$$TPR(F,\phi)=\int H(L(F(x)),\phi)p(F(x),x|z\neq 0)dx \qquad (7)$$

[Reference Literature 1] J. Neyman, et al., "On the Problem of the Most Efficient Tests of Statistical Hypotheses", Phi. Trans. of the Royal Society, 1933.

When a threshold at which FPR=$\rho$ is satisfied is represented as $\varphi_\rho$, an objective function to be maximized can be expressed as the following.

$$J=TPR(F,\phi_\rho)+\{\rho-FPR(F,\phi_\rho)\} \qquad (8)$$

Taking into account $\rho$ as a constant having no relation to F when an issue of variation for maximizing this objective function for F is considered, the optimum feature amount extraction function F can be obtained by the following formula.

$$F \leftarrow \underset{F}{\mathrm{argmin}} - TPR(F, \phi_\rho) + FPR(F, \phi_\rho) \qquad (9)$$

In other words, the feature amount extraction function F is set so that FPR(F,$\varphi_\rho$) is smaller and TPR(F,$\varphi_\rho$) is greater. Here, "FPR(F,$\varphi_\rho$) is smaller" corresponds to "a degree of anomaly calculated based on an acoustic feature of normal sound obtained by using the feature amount extraction function F is smaller than the threshold $\varphi_\rho$". Further, "TPR (F,$\varphi_\rho$) is greater" corresponds to "a degree of anomaly calculated based on an acoustic feature of input anomalous sound obtained by using the feature amount extraction function F is greater than the threshold $\varphi_\rho$". Accordingly, it can be said that the feature amount extraction function F is set so that a degree of anomaly calculated based on an acoustic feature of normal sound obtained by using the feature amount extraction function F is smaller than the threshold $\varphi_\rho$ and a degree of anomaly calculated based on an acoustic feature of input anomalous sound obtained by using the feature amount extraction function F is greater than the threshold $\varphi_\rho$.

Hereinafter, an optimization index of Formula (9) is referred to as a "Neyman-Pearson-type optimization index". An implementing example for optimizing F by using this index is described below.

(Neyman Pearson Variational Autoencoder)

Formula (9) is deformed to have an optimizing form by using training data. First, expectation operations for a FPR and a TPR are replaced with arithmetic means of training data. Here, T represents the number of training data.

$$F \leftarrow \underset{F}{\operatorname{argmin}} - \frac{1}{T}\sum_{\tau=1}^{T} H(L(F(x_\tau)), \phi_\rho) + \frac{1}{K}\sum_{k=1}^{K} H(L(F(x_k)), \phi_\rho) \quad (10)$$

Here, $x_\tau$ and $x_k$ respectively represent training data for normal sound and training data for anomalous sound. However, it is difficult to collect training data for anomalous sound (unsupervised training). Therefore, sampling is performed based on $p(F(x),x|z\neq 0)$ in unsupervised training.

A probability distribution $p(F(x),x|z\neq 0)$ followed by anomalous sound should be known so as to sample anomalous sound. However, information that what kind of anomalous sound is produced is often unknown, and it is accordingly difficult to directly estimate $p(F(x),x|z\neq 0)$. It is therefore considered that estimation of a probability distribution $p(F(x),x)$ followed by every kind of sound is easier than estimation of $p(F(x),x|z\neq 0)$ and $p(F(x),x)$ is accordingly estimated.

As to anomaly detection in mechanical sound of factories, for example, every kind of sound means every kind of mechanical sound recorded in various factories. In other words, every kind of sound is sound which can include normal sound and anomalous sound. More specifically, every kind of sound is sound which is produced in an environment, in which an anomalous sound detection apparatus is used, and which can include normal sound and anomalous sound. According to the Bayes' theorem, $p(F(x),x)$ can be decomposed as follows. Here, "$\propto$" represents proportion.

$$p(F(x), x) = \sum_{i=0}^{\infty} p(F(x), x \mid z = i)p(z = i) \quad (11)$$

$$= p(F(x), x \mid z = 0)p(z = 0) + \quad (12)$$

$$\sum_{i=0}^{\infty} p(F(x), x \mid z = i)p(z = i)$$

$$\propto p(F(x), x \mid z = 0) + p(F(x), x \mid z \neq 0) \quad (13)$$

Formula (12) is deformed to Formula (13) in an assumption that class prior distribution $p(z)$ is constant. That is, through estimation of $p(F(x),x)$ and $p(F(x),x|z=0)$, a probability distribution followed by sound other than normal sound, in other words, a probability distribution $p(F(x),x|z\neq 0)$ followed by anomalous sound can be estimated by the following formula.

$$p(F(x),x|z\neq 0) \propto p(F(x),x) - p(F(x),x|z=0) \quad (14)$$

A probability distribution followed by anomalous sound, a probability distribution followed by every kind of sound, and a probability distribution followed by normal sound are respectively expressed as $p(F(x)|z\neq 0)$, $p(F(x))$, and $p(F(x)|z=0)$ as well. A "probability distribution followed by sound" is also referred to as a "probability distribution modeling sound".

Thus, it can be said that a probability distribution $p(F(x)|z\neq 0)$ modeling anomalous sound is a probability distribution obtained by removing a probability distribution $p(F(x)|z=0)$ modeling normal sound from a probability distribution $p(F(x))$ modeling every kind of sound (sound which can include normal sound and anomalous sound).

Further, a feature amount extraction function is obtained based on this Formula (14) as described below, so that it can be said that a feature amount extraction function is based on the probability distribution $p(F(x))$ modeling every kind of sound (sound which can include normal sound and anomalous sound), the probability distribution $p(F(x)|z=0)$ modeling normal sound, and the probability distribution $p(F(x)|z\neq 0)$ modeling anomalous sound.

Figure 5:
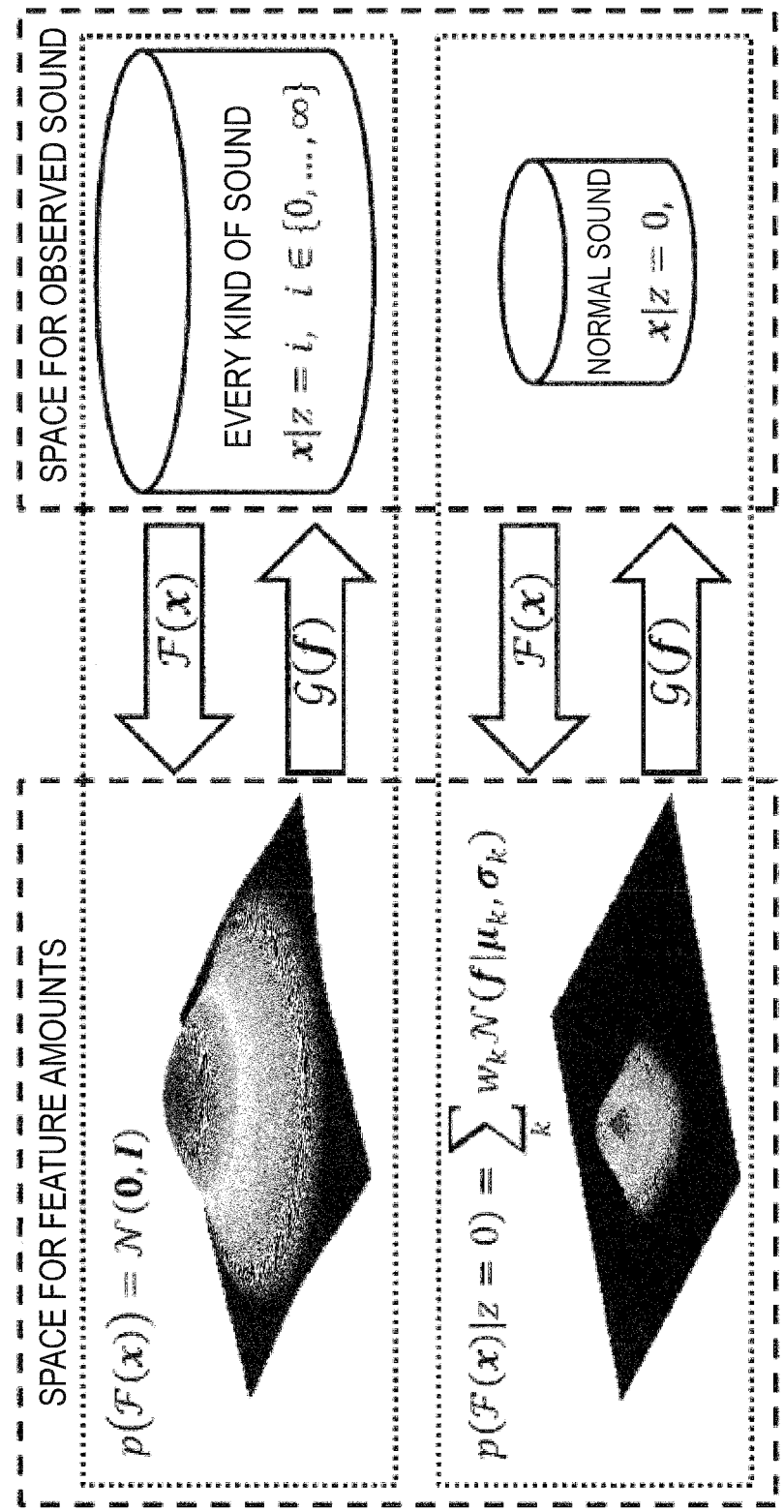
FIG. 5 is a diagram for describing extraction of feature amounts and an image of distribution of the feature amounts.

The above-described theory is intuitively illustrated in FIG. 5. Considering a space for feature amounts as the left in FIG. 5, every kind of sound should be widely distributed in the space for feature amounts and normal sound should be distributed in a part of the space. Therefore, anomalous sound corresponds to sound produced with high probability in a distribution of every kind of sound (e.g., mechanical sound that can be produced in real world) and with low probability in a distribution of normal sound (e.g., mechanical sound that is not similar to sound of devices which are monitoring objects).

A method for estimating $p(F(x),x)$ with high precision is variational autoencoder, for example (see Reference Literature 2, for instance).

[Reference Literature 2] D. P. Kingma, and M. Welling, "Auto-encoding variational Bayes", Proceedings of the International Conference on Learning Representations (ICLR), 2014.

Though details should be consulted with Reference Literature, variational autoencoder is a method in which a function for generating an observation signal from a latent variable (sound feature amount) $f=F(x)$ (hereinafter, referred to as a "feature amount inverse transformation function"):

$$x = G(F(x)) \quad (15)$$

is prepared and F and G are optimized so that the following objective function is minimized.

$$F, G \leftarrow \underset{F,G}{\operatorname{argmin}} KL[q(F(x)|x)|p(F(x))] - \frac{1}{K}\sum_{k} \ln p(x_k \mid G(f_k^s)) \quad (16)$$

Here, $KL[a|b]$ represents KL divergence of probability distributions a and b. In the present invention, $$p(F(x)) = N(0, I_D) \quad (17)$$

$$q(F(x)|x) = N(F(x), I_D) \quad (18)$$

are defined for the sake of simplicity. Here, $N(\mu, \Sigma)$ represents a multidimensional normal distribution having a mean vector $\mu$ and a covariance matrix $\Sigma$, and $I_D$ represents a D dimensional unit matrix. Further, $f^s$ represents a value obtained through sampling from Formula (18) and a probability distribution of the second term of Formula (16) is expressed as:

$$p(x|G(f^s)) = N(x|G(f^s), I_H) \quad (19)$$

From Formula (17) and Formula (19), $$p(F(x), x) = p(x \mid F(x))p(F(x))) \quad (21)$$

$$= p(x \mid G(F(x))p(F(x)))$$

are obtained. Further, when it is assumed that F and G are deterministic information transformation, $p(x|G(F(x))$ is constantly a delta function based on Formula (1) and Formula (15). Therefore, $$p(F(x), x) \propto \sum_{i=0}^{\infty} p(F(x) \mid z = i) \quad (22)$$

is obtained. Accordingly, K pieces of sound feature amounts $f_k^s$ of anomalous sound are first generated by $$f_k^s \sim p(F(x)) - p(F(x)|z=0) \quad (23)$$

so as to generate anomalous sound data. "~" in Formula (23) represents that $f_k^s$ follows a probability distribution $p(F(x)) - p(F(x)|z=0)$. Then, anomalous sound data $x_k$ may be generated by $$x_k \leftarrow G(f_k^s) \quad (24).$$

Thus, anomalous sound data $x_k$ is generated by using at least the probability distribution $p(F(x))$ modeling sound which can include normal sound and anomalous sound, the probability distribution $p(F(x)|z=0)$ modeling normal sound, and the feature amount inverse transformation function G.

Further, considering Formula (14), Formula (23), and Formula (24), it can be said that anomalous sound is generated by sampling an acoustic feature following the probability distribution $p(F(x)) - p(F(x)|z=0)$ modeling anomalous sound and using the sampled sound feature amount $f_k$ and the feature amount inverse transformation function G.

Thus, optimization of a feature amount extraction function can be realized by optimizing a feature amount extraction function and a feature amount inverse transformation function while alternately using an optimization index of a variational autoencoder of Formula (16) and the Neyman-Pearson-type optimization index of Formula (10). However, anomalous sound data used for optimizing Formula (10) is generated based on Formula (23) and Formula (24).

Specific Execution Example

Figure 6:
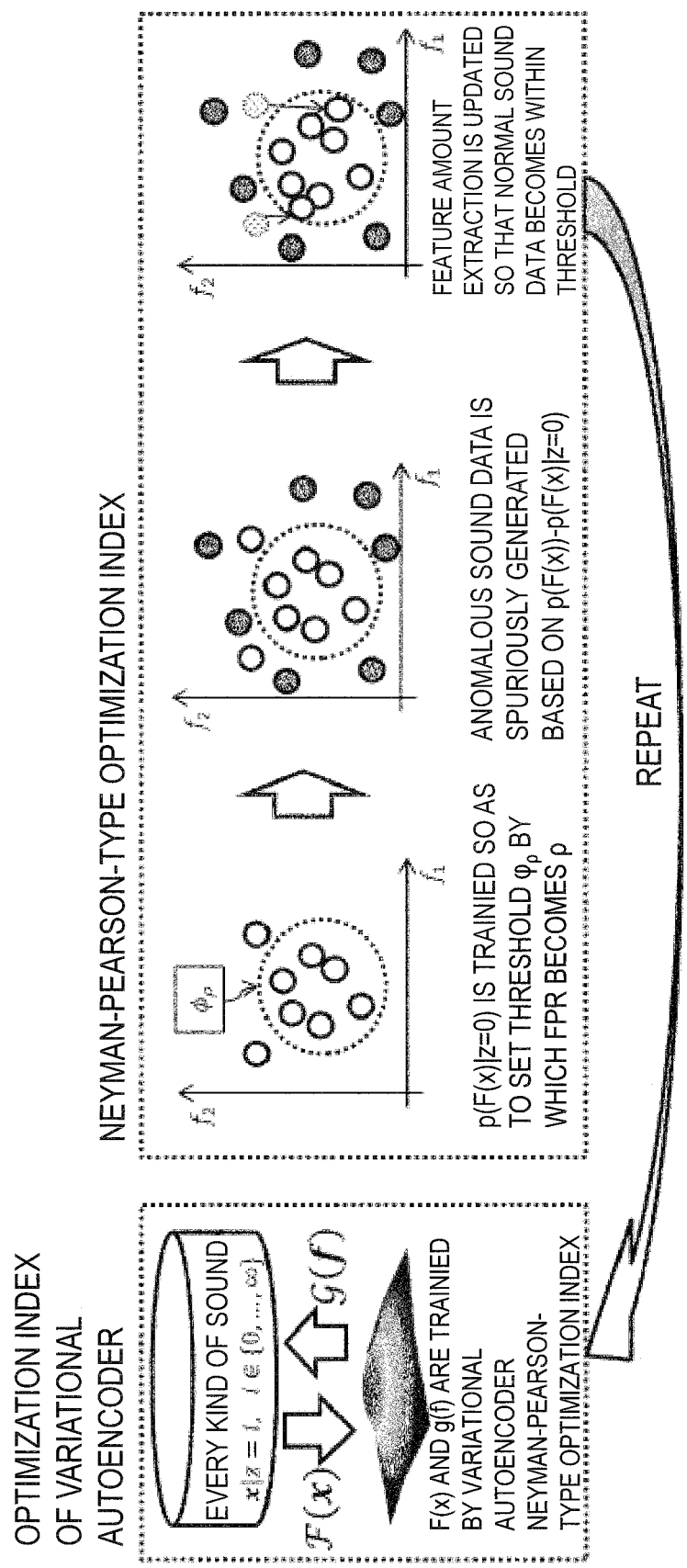
FIG. 6 is a diagram for describing an intuitive image of a training procedure.
Figure 7:
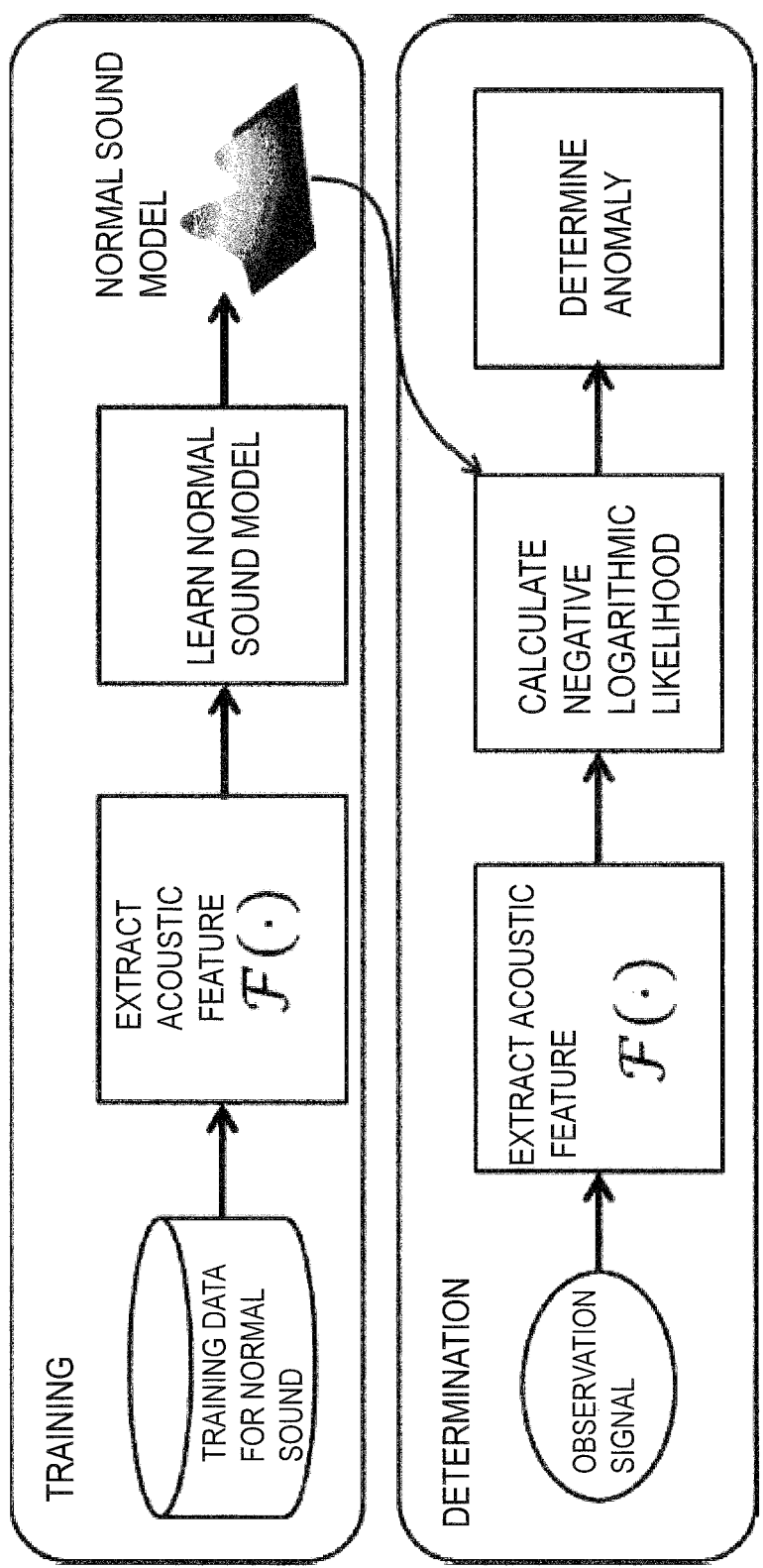
FIG. 7 is a diagram for describing a conventional technique.

FIG. 6 illustrates an intuitive image of an execution procedure according to the present embodiment. The present embodiment is realized by repeating a four-stage training procedure.

First, F and G are trained in accordance with an optimization index of a variational autoencoder. Here, F and G can be implemented by a fully-connected multilayer perceptron and a multilayer convolution neural network, for example. Further, in anomalous sound detection of mechanical sound, sound data recorded in various factories and sound data of human beings, for example, may be used as every kind of sound.

Then, an acoustic feature is extracted from training data $x_\tau(\tau \in \{1, \ldots, T\})$ of normal sound.

$$f_\tau = F(x_\tau) \quad (25)$$

Subsequently, a normal sound model is trained based on the data. For this, a Gaussian mixture distribution:

$$p(F(x)|z=0) = \sum_{c=1}^{C} w_c N\left(\mu_c, \Sigma_c\right), \quad (26)$$

for example, can be used. Here, C represents the number of mixtures, and $w_c$, $\mu_c$, and $\Sigma_c$ respectively represent a mixture ratio, a mean vector, and a covariance matrix for the c-th distribution. This training can be realized by using an EM algorithm, for example (see Reference Literature 3, for instance).

[Reference Literature 3] Sadanori Konishi, "Introduction to Multivariate Analysis, Appendix C: EM algorithm", pp. 294-298, Iwanami Shoten, 2010.

At the end, a threshold $\varphi_\rho$ is determined by using p which is a preset FPR. For this, the $\rho_T$-th degree of anomaly, which is obtained such that degrees of anomaly L(F(x)) are calculated by using all training data for normal sound and the calculated degrees of anomaly L(F(x)) are sorted in a descending order, may be used.

Then, anomalous sound data is generated based on Formula (23) and Formula (24). In order to more simply generate $f_k^s$, the following procedures 1. to 3. may be used. Based on these procedures 1. to 3., $f_k^s$ following Formula (23) can be generated. Thus, $f_k^s$ following Formula (23) may be generated by setting a value $\tilde{f}_k^s$ approximating to $f_k^s$ which is generated through these procedures 1. to 3. and follows Formula (23) as $f_k^s$.

1. $\tilde{f}_k^s$ is generated from $p(F(x))$.
2. A degree of anomaly $L(\tilde{f}_k^s)$ is calculated.
3. If the degree of anomaly $L(\tilde{f}_k^s)$ is greater than $\varphi_\rho$, $f_k^s \leftarrow \tilde{f}_k^s$ is defined. If the degree of anomaly $L(\tilde{f}_k^s)$ is smaller than $\varphi_\rho$, $\tilde{f}_k^s$ is discarded, returning to 1.

Thus, anomalous sound may be generated by using the probability distribution $p(F(x))$ modeling sound which can include normal sound and anomalous sound, the feature amount inverse transformation function G which is an inverse function of a feature amount extraction function, and the threshold $\varphi_\rho$.

At the end, F is updated by using the Neyman-Pearson-type optimization index of Formula (10). When F is implemented by a multilayer perceptron or the like, the error back propagation method may be employed.

[Anomalous Sound Detection Training Apparatus and Method]

Figure 2:
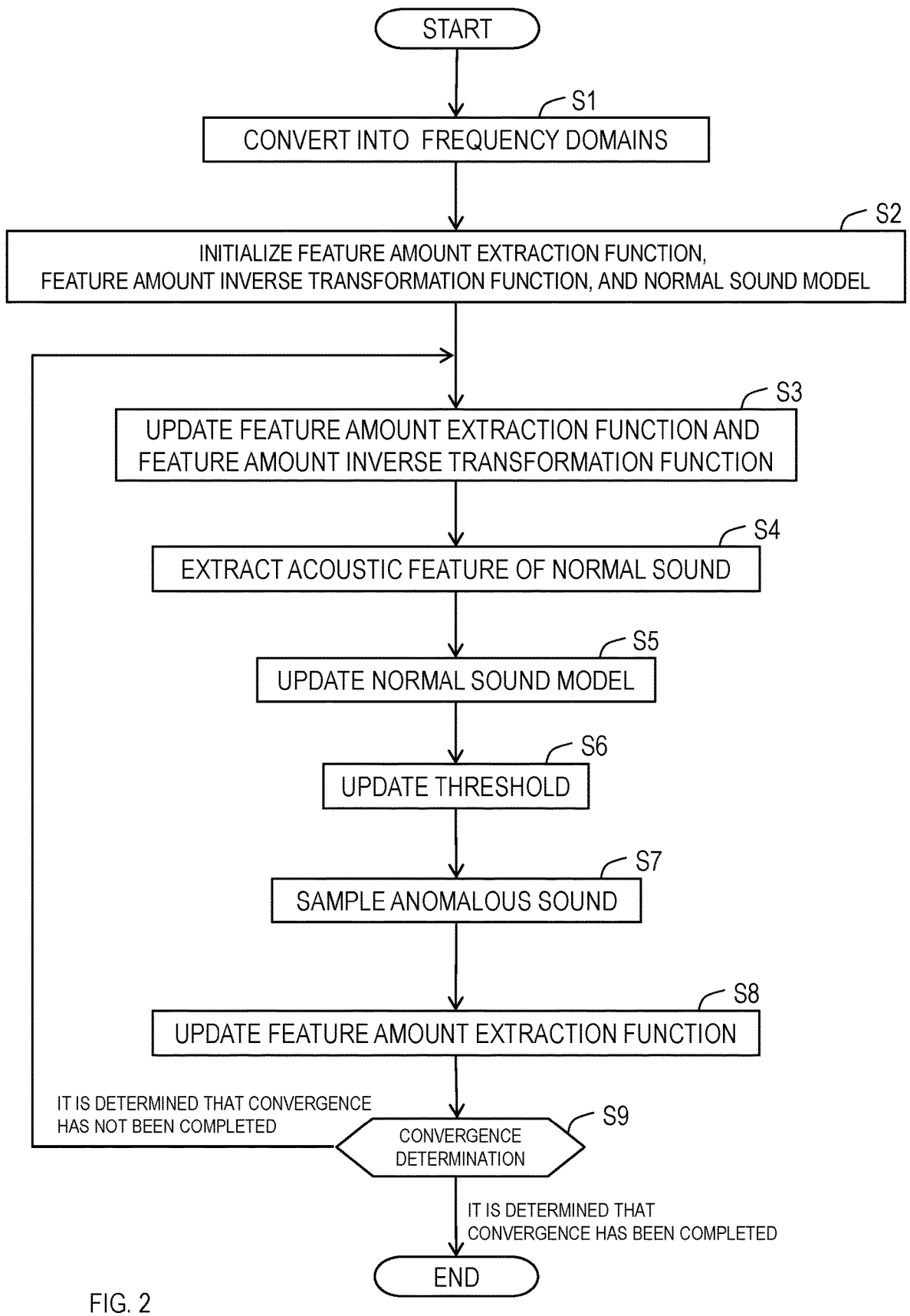
FIG. 2 is a flowchart for describing an example of an anomalous sound detection training method.

As exemplarily shown in FIG. 1, an anomalous sound detection training apparatus includes a frequency domain conversion unit 1, an initialization unit 2, a first function updating unit 3, an acoustic feature extraction unit 4, a normal sound model updating unit 5, a threshold updating unit 6, an anomalous sound data sampling unit 7, and a second function updating unit 8. An anomalous sound detection training method is implemented by the units of the anomalous sound detection training apparatus executing the processing at step S1 to S9 described in FIG. 2 and below.

The anomalous sound data sampling unit 7 is an anomalous sound generation apparatus as well.

Normal sound data and every kind of sound data are input to the anomalous sound detection training apparatus. These sampling frequencies are appropriately set in accordance with a property of sound desired to be analyzed. The sampling frequency is set to approximately 16 kHz, for example.

Further, it is assumed that parameters of a feature amount extraction function, a feature amount inverse transformation function, and a normal sound model are set. As for a multilayer perceptron, for example, the number of layers of an intermediate layer and the number of hidden units are input. For a normal sound model, the number of mixtures is input in the case of a Gaussian mixture distribution. Further, the number of dimensions of a feature amount D=16 and $\rho$=0.05, approximately, may be set, for example.

<Frequency Domain Conversion Unit 1>

The frequency domain conversion unit 1 converts each of input training data for normal sound and input every kind of sound data into frequency domains (step S1). Short-time Fourier transformation or the like may be employed for the conversion. At this time, the Fourier transformation length may be set at approximately 512 points and the shift length may be set at approximately 256 points, for example.

The training data for normal sound which is converted into the frequency domain is input to the acoustic feature extraction unit 4. The training data for normal sound which is converted into the frequency domain is input to the first function updating unit 3.

<Initialization Unit 2>

The initialization unit 2 initializes a feature amount extraction function, a feature amount inverse transformation function, and a normal sound model in accordance with the input parameters (step S2).

The initialized feature amount extraction function is input to the acoustic feature extraction unit 4. The initialized feature amount extraction function and feature amount inverse transformation function are input to the first function updating unit 3. The initialized normal sound model is input to the normal sound model updating unit 5.

<First Function Updating Unit 3>

The first function updating unit 3 updates the input feature amount extraction function and feature amount inverse transformation function based on an optimization index of a variational autoencoder of Formula (16), for example (step S3). In other words, the feature amount extraction function is subjected to the first update in the first function updating unit 3 based on the optimization index of the variational autoencoder.

A probabilistic gradient method, for example, may be used for this update. The batch size (the amount of data used for one update) in this case may be set at approximately 512, for example.

The updated feature amount extraction function and feature amount inverse transformation function are input to the second function updating unit 8.

<Sound Feature Amount Extraction Unit 4>

The acoustic feature extraction unit 4 extracts an acoustic feature of normal sound based on the input training data for normal sound by using the input feature amount extraction function (step S4).

The extracted sound feature amount of normal sound is output to the normal sound model updating unit 5 and the second function updating unit 8.

The first processing by the acoustic feature extraction unit 4 is performed by using the feature amount extraction function initialized by the initialization unit 2. The second and subsequent processing by the acoustic feature extraction unit 4 are performed by using a feature amount extraction function updated by the second function updating unit 8.

<Normal Sound Model Updating Unit 5>

The normal sound model updating unit 5 updates a normal sound model by using the acoustic feature extracted at the acoustic feature extraction unit 4 (step S5). The updated normal sound model is input to the second function updating unit 8.

<Threshold Updating Unit 6>

The threshold updating unit 6 obtains a threshold $\varphi_\rho$ corresponding to the false positive rate $\rho$, which has a predetermined value, by using the input training data for normal sound and the input feature amount extraction function (step S6).

The obtained threshold $\varphi_\rho$ is input to the anomalous sound data sampling unit 7 and the second function updating unit 8.

For example, the threshold updating unit 6 calculates degrees of anomaly $L(F(x))$ by using all training data for normal sound and uses the N-th degree of anomaly from the top among the degrees of anomaly $L(F(x))$ sorted in a descending order, as the threshold $\varphi_\rho$. Here, N represents a predetermined positive integer. N=round($\rho$T) holds, for example. Here, round(•) represents round processing with respect to an integer. • is an arbitrary number.

The threshold $\varphi_\rho$ is thus set by using degrees of anomaly obtained from normal sound, for example. More specifically, the threshold $\varphi_\rho$ is set by using degrees of anomaly obtained from normal sound so that probability that input training data for normal sound is detected as anomalous sound is to have a preset false positive rate (error detection rate) $\rho$. However, the threshold $\varphi_\rho$ may be set by using degrees of anomaly obtained from normal sound so that probability that input training data for anomalous sound is detected as anomalous sound is to have a preset true positive rate (error detection rate) $\rho$.

The first processing by the threshold updating unit 6 is performed by using the feature amount extraction function initialized by the initialization unit 2. The second and subsequent processing by the threshold updating unit 6 are performed by using a feature amount extraction function updated by the second function updating unit 8.

<Anomalous Sound Data Sampling Unit 7>

The anomalous sound data sampling unit 7 spuriously generates anomalous sound data and samples the anomalous sound data (step S7). The sampled anomalous sound data is input to the second function updating unit 8.

For example, the anomalous sound data sampling unit 7 spuriously generates anomalous sound data and samples the anomalous sound data by using a feature amount inverse transformation function and the threshold $\varphi_\rho$ through the above-described procedures 1. to 3.

Specifically, the anomalous sound data sampling unit 7 generates a value $\tilde{f}_k^s$ obtained by approximating the acoustic feature $f_k^s$ following the probability distribution $P(F(x))$ modeling sound which can include normal sound and anomalous sound through the procedure 1.

Then the anomalous sound data sampling unit 7 calculates a degree of anomaly $L(\tilde{f}_k^s)$ based on $\tilde{f}_k^s$ through the procedure 2.

Subsequently, the anomalous sound data sampling unit 7 compares the calculated degree of anomaly $L(\tilde{f}_k^s)$ with the threshold $\varphi_\rho$ so as to determine whether or not $\tilde{f}_k^s$ can be accepted as the acoustic feature $f_k^s$ through the procedure 3. If $L(\tilde{f}_k^s) > \varphi_\rho$, the anomalous sound data sampling unit 7 accepts $\tilde{f}_k^s$ as the acoustic feature $f_k^s$.

Then, the anomalous sound data sampling unit 7 calculates an output value, which is obtained when $\tilde{f}_k^s$ which is accepted as the acoustic feature $f_k^s$ is input to the feature amount inverse transformation function G, based on Formula (24).

The anomalous sound data sampling unit 7 thus generates anomalous sound data, for example.

The anomalous sound data sampling unit 7 may generate anomalous sound data based on Formula (23) and Formula (24) so as to perform sampling for anomalous sound.

If training data for anomalous sound is available, namely in the case of supervised training, sampling is not performed. That is, the subsequent processing may be performed using the training data for anomalous sound as the sampling result. Needless to say, sampling may be performed in combination.

An acoustic feature of anomalous sound is input to the second function updating unit 8 as anomalous sound data. Therefore, the anomalous sound data sampling unit 7 may perform sound feature amount extraction processing for extracting an acoustic feature of sampled anomalous sound. The first processing of this sound feature amount extraction processing is performed by using the feature amount extraction function initialized by the initialization unit 2. The second and subsequent processing of this sound feature amount extraction processing are performed by using a feature amount extraction function updated by the second function updating unit 8.

<Second Function Updating Unit 8>

The second function updating unit 8 updates the feature amount extraction function, which is updated in the first function updating unit 3, based on the Neyman-Pearson-type optimization index of Formula (10) defined by the threshold $\varphi_\rho$ obtained in the threshold updating unit 6, by using the acoustic feature of normal sound extracted in the acoustic feature extraction unit 4 and the input sound feature amount of anomalous sound (step S8). In other words, the feature amount extraction function is subjected to the second update in the second function updating unit 8 based on an index defined based on an acoustic feature of normal sound, an acoustic feature of anomalous sound, and a threshold. The second function updating unit 8 may update a feature amount inverse transformation function in a similar manner in addition to the feature amount extraction function updated in the first function updating unit 3.

The updated feature amount extraction function is input to the first function updating unit 3, the acoustic feature extraction unit 4, the threshold updating unit 6, and the anomalous sound data sampling unit 7. When a feature amount inverse transformation function is updated, this updated feature amount inverse transformation function is input to the first function updating unit 3, the acoustic feature extraction unit 4, the threshold updating unit 6, and the anomalous sound data sampling unit 7.

Also, the feature amount extraction function and the normal sound model as finally updated after repeated control by the control unit 9 are output as a final result of training performed by the anomalous sound detection training apparatus and method.

<Control Unit 9>

The control unit 9 repeatedly performs processing of the first function updating unit 3, the acoustic feature extraction unit 4, the normal sound model updating unit 5, and the second function updating unit 8, and processing of the threshold updating unit 6 and the anomalous sound data sampling unit 7, with a feature amount extraction function updated by the second function updating unit 8 and used as an input. If a feature amount inverse transformation function is further updated by the second function updating unit 8, the control unit 9 repeatedly performs processing of the first function updating unit 3, the acoustic feature extraction unit 4, the normal sound model updating unit 5, and the second function updating unit 8, and processing of the threshold updating unit 6 and the anomalous sound data sampling unit 7, with the feature amount extraction function and the feature amount inverse transformation function which are updated by the second function updating unit 8 and are used as inputs. These repeated processing are performed until the feature amount extraction function and the normal sound model converge (step S9).

Setting a first convergence condition as that the number of executions of repeated processing reaches a certain number of times (for instance, 1000 times), for example, the control unit 9 performs control so as to repeatedly perform the above-mentioned repeated processing until the first convergence condition is satisfied. The first convergence determination condition may also be a different condition.

[Anomalous Sound Detection Apparatus and Method]

Figure 3:
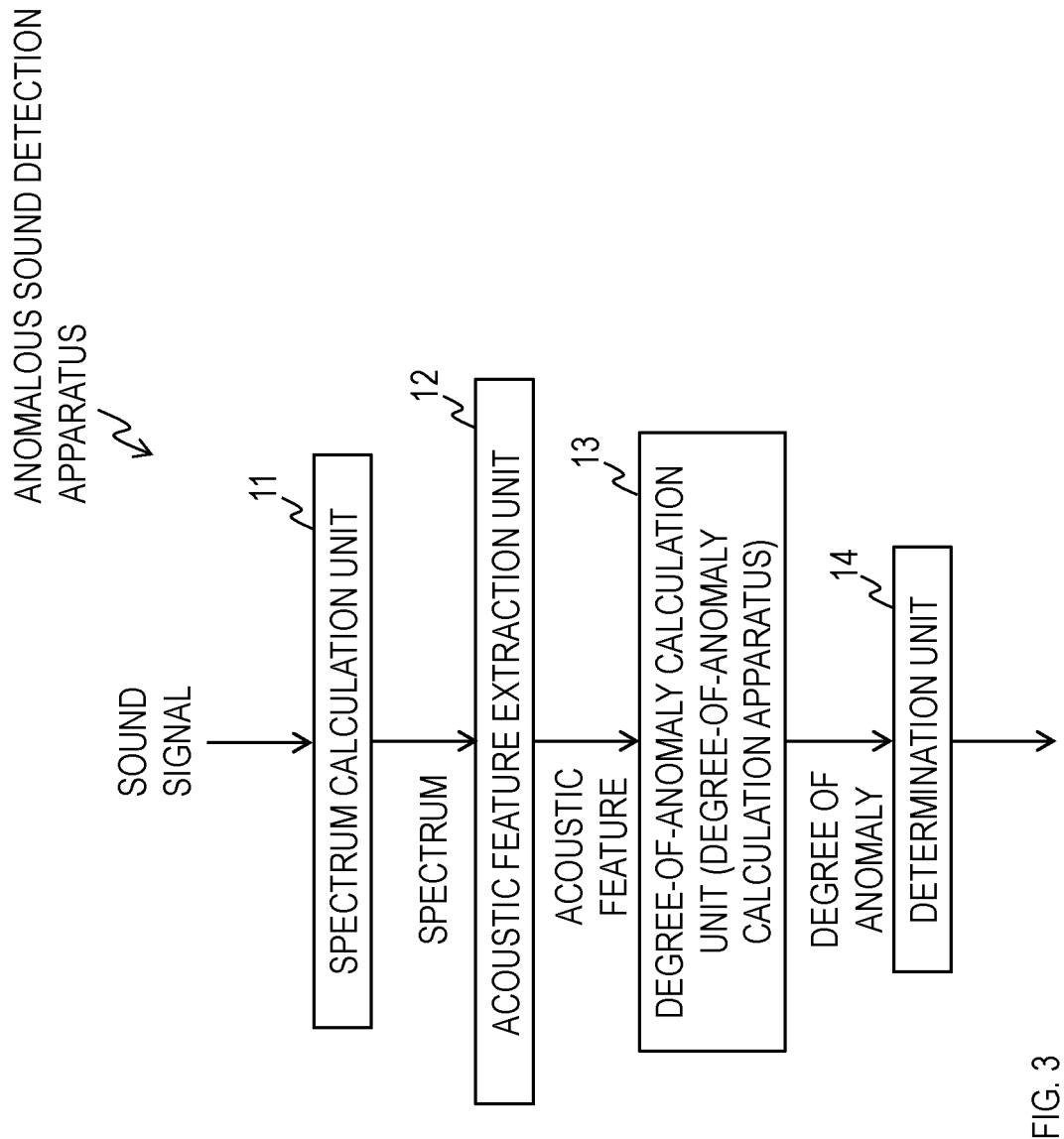
FIG. 3 is a block diagram for describing an example of an anomalous sound detection apparatus.
Figure 4:
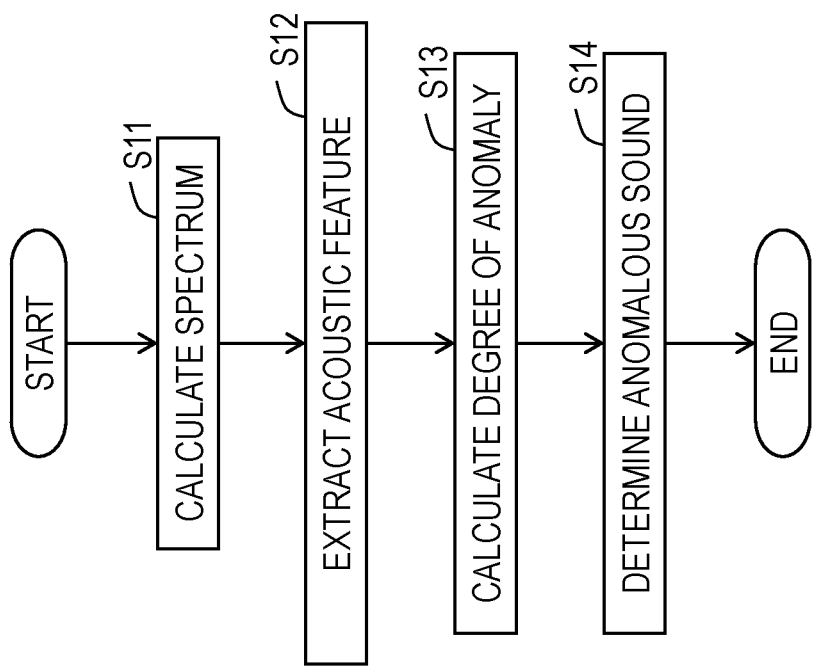
FIG. 4 is a flowchart for describing an example of an anomalous sound detection method.

As exemplarily shown in FIG. 3, an anomalous sound detection apparatus includes a spectrum calculation unit 11, an acoustic feature extraction unit 12, a degree-of-anomaly calculation unit 13, and a determination unit 14. An anomalous sound detection method is implemented by the units of the anomalous sound detection apparatus executing the processing at step S11 to S14 described in FIG. 4 and below.

The degree-of-anomaly calculation unit 13 is also a degree-of-anomaly calculation apparatus.

<Spectrum Calculation Unit 11>

Operational sound of a machine for which anomalous sound is to be detected is collected through a microphone. The sampling rate used for this collection is similar to the one used for training. The collected sound signal is input to the spectrum calculation unit 11.

The spectrum calculation unit 11 obtains an acoustic feature based on the collected sound signal in a similar manner to the frequency domain conversion unit 1 (step S11). The obtained sound feature amount is output to the acoustic feature extraction unit 12.

<Sound Feature Amount Extraction Unit 12>

The acoustic feature extraction unit 12 uses the obtained sound feature amount to extract an acoustic feature of the collected sound signal based on the feature amount extraction function that has been output by the anomalous sound detection training apparatus and method as the final result of training (step S12). In other words, the acoustic feature extraction unit 12 extracts an acoustic feature of input sound by using the feature amount extraction function.

The extracted sound feature amount is output to the degree-of-anomaly calculation unit 13.

<Degree-of-Anomaly Calculation Unit 13>

The degree-of-anomaly calculation unit 13 calculates a degree of anomaly $L(F(x))$ which is a negative logarithmic likelihood by using the extracted sound feature amount and a normal sound model that has been output by the anomalous sound detection training apparatus and method as the final result of training (step S13). In other words, the degree-of-anomaly calculation unit 13 calculates a degree of anomaly of input sound by using the extracted sound feature amount.

The calculated degree of anomaly is output to the determination unit 14.

<Determination Unit 14>

The determination unit 14 outputs "anomalous" if the degree of anomaly of a current frame is equal to or greater than threshold $\phi$ (step S14). In other words, the determination unit 14 determines whether or not input sound is anomalous sound based on the obtained degree of anomaly and the threshold.

Although the threshold should be adjusted in accordance with the machine and/or environment in question, it may be set at about 1500, for example.

As with voice activity detection, "hangover", which suppresses detection errors with heuristic rules, may be used. While the hangover processing to be applied may be any of various types, the hangover processing should be set in accordance with the types of false detection of anomalous sound.

As an example, musical noise that occurs during noise suppression could be determined as a sporadic anomalous sound. Since sound like a sporadic hitting sound often exhibits change in spectrum shape for 100 ins or more, the degree of anomaly would remain equal to or greater than the threshold for ₍(100/the frame shift width for STFT)₎ frames continuously. However, because in musical noise an anomalous amplitude spectrum value only occurs in the relevant frames, there would be several frames at most where the degree of anomaly remains equal to or greater than the threshold continuously. Thus, a rule for anomaly determination may be set as "outputting "anomalous" if the degree of anomaly remains equal to or greater than the threshold for $F_1$ frames or more continuously", for example.

As another example, it is also conceivable that anomalous sound continues for a long period of time with the degree of anomaly slightly below the threshold due to a low volume of the anomalous sound. In such a case, a rule like "detecting a sound as anomalous if a total sum of its degree of anomaly over the last $F_2$ frames is equal to or greater than $\phi_1$," may be added as a determination rule for continuous anomalous sound. Although $\phi_1$ should be determined by tuning, it may be set at about $\phi_1=F_2\times(\phi-250)$, for example.

By detecting anomalous sound from a large-sized manufacturing or molding machine installed in a factory or the like using the anomalous sound detection apparatus and method as described above, faster handling of a failure and/or failure prediction become possible. This can contribute to increased efficiency of an industry, for example, manufacturing industry in particular.

[Program and Recording Medium]

In the case of implementing the processing in the anomalous sound detection training apparatus, the anomalous sound detection apparatus, the degree-of-anomaly calculation apparatus, or the anomalous sound generation apparatus with a computer, the processing details of the functions to be provided by the anomalous sound detection training apparatus or the anomalous sound detection apparatus are described by a program. By the computer then executing the program, the processing is implemented on the computer.

The program describing the processing details may be recorded in a computer-readable recording medium. The computer-readable recording medium may be any kind of medium, for example, a magnetic recording device, an optical disk, a magneto-optical recording medium, and a semiconductor memory.

In addition, individual processing means may be embodied by execution of a predetermined program on a computer or at least some of their processing details may be implemented in hardware.

[Modifications]

In addition to being executed chronologically in the order described, the processing described for the anomalous sound detection training apparatus, the anomalous sound detection apparatus, the degree-of-anomaly calculation apparatus, or the anomalous sound generation apparatus may also be executed in parallel or individually depending on the processing ability of the apparatus executing the processing or on any necessity.

The description only related to sound has been provided above, but the present invention is applicable also to other time series data such as signals obtained in a temperature sensor and an acceleration sensor. In this case, sound data as an input may be changed to sensor data.

That is, the anomalous sound detection training apparatus, the anomalous sound detection apparatus, and the anomalous sound generation apparatus that have been described above may be an anomalous signal detection training apparatus, an anomalous signal detection apparatus, and an anomalous signal generation apparatus respectively. Description of the anomalous signal detection training apparatus, the anomalous signal detection apparatus, and the anomalous signal generation apparatus is the same as description obtained by replacing "sound" by "signal" and replacing "sound feature amount" by "feature amount" in the above description of the anomalous sound detection training apparatus, the anomalous sound detection apparatus, and the anomalous sound generation apparatus. Therefore, duplicate description is omitted here.

It goes without saying that other modifications may be made as desired without departing from the scope of this invention.

What is claimed is:

1. An anomalous sound detection apparatus that detects whether or not input sound, the input sound being input, is anomalous sound, the anomalous sound detection apparatus comprising:
  processing circuitry configured to implement
    an acoustic feature extraction unit that extracts an acoustic feature of the input sound by using a feature amount extraction function that is optimized based on probability distribution modeling sound which includes normal sound and anomalous sound, probability distribution modeling normal sound, and probability distribution modeling anomalous sound that is input;
    a degree-of-anomaly calculation unit that calculates a degree of anomaly of the input sound by using the acoustic feature that is extracted; and
    a determination unit that determines whether or not the input sound is anomalous sound based on the degree of anomaly that is obtained and a threshold that is set by using degrees of anomaly obtained from the normal sound.

2. The anomalous sound detection apparatus according to claim 1, wherein
  the feature amount extraction function is set so that a degree of anomaly calculated from an acoustic feature of normal sound, the acoustic feature of normal sound being obtained by using the feature amount extraction function, is smaller than the threshold and a degree of anomaly calculated from an acoustic feature of anomalous sound, the anomalous sound being input, the acoustic feature of the anomalous sound being obtained by using the feature amount extraction function, is greater than the threshold.

3. The anomalous sound detection apparatus according to claim 2, wherein
  the feature amount extraction function is a function that is generated through a first update based on an optimization index of a variational autoencoder and a second update based on an index that is defined based on the acoustic feature of normal sound, the acoustic feature of anomalous sound, and the threshold.

4. The anomalous sound detection apparatus according to claim 3, wherein
  the index is a Neyman-Pearson-type optimization index.

5. The anomalous sound detection apparatus according to claim 1, wherein
  the probability distribution modeling normal sound is a probability distribution obtained by removing the probability distribution modeling normal sound from the probability distribution modeling sound which includes normal sound and anomalous sound.

6. The anomalous sound detection apparatus according to claim 1, wherein
  the anomalous sound, the anomalous sound being input, is generated by using the probability distribution modeling sound which includes normal sound and anomalous sound, a feature amount inverse transformation function that is an inverse function of the feature amount extraction function, and the threshold.

7. The anomalous sound detection apparatus according to claim 6, wherein the anomalous sound, the anomalous sound being input, is generated by generating an acoustic feature $f_k^s$ following Formula (23) below:

$$f_k^s \sim p(F(x)) - p(F(x)|z=0) \qquad (23)$$

when p(F(x)) is set as the probability distribution modeling sound which can include normal sound and anomalous sound and p(F(x)|z=0) is set as the probability distribution modeling normal sound.

8. The anomalous sound detection apparatus according to any one of claims 1 to 7, wherein
the threshold is an N-th degree of anomaly from a top among the degrees of anomaly that are obtained from the normal sound and are sorted in a descending order, when N is set as a predetermined positive integer.

9. A degree-of-anomaly calculation apparatus that calculates a degree of anomaly of input sound, the input sound being input, so as to detect whether or not the input sound is anomalous sound, the degree-of-anomaly calculation apparatus comprising:
processing circuitry configured to implement
an acoustic feature extraction unit that extracts an acoustic feature of the input sound by using a feature amount extraction function that is optimized based on probability distribution modeling sound which includes normal sound and anomalous sound, probability distribution modeling normal sound, and probability distribution modeling anomalous sound that is input; and
a degree-of-anomaly calculation unit that calculates a degree of anomaly of the input sound by using the acoustic feature that is extracted.

10. An anomalous sound generation apparatus that generates anomalous sound based on sound which includes normal sound and anomalous sound, the anomalous sound generation apparatus comprising:
processing circuitry configured to implement
an anomalous sound generation unit that generates anomalous sound by using probability distribution modeling the sound which includes normal sound and anomalous sound, a feature amount inverse transformation function that is an inverse function of a feature amount extraction function, and a threshold that is set by using degrees of anomaly obtained from the normal sound, and
the feature amount inverse transformation function is an inverse transformation function of a feature amount transformation function that is based on the probability distribution modeling the sound which includes normal sound and anomalous sound, probability distribution modeling normal sound, and probability distribution modeling anomalous sound that is input.

11. The anomalous sound generation apparatus according to claim 10, wherein
the anomalous sound generation unit generates the anomalous sound such that the anomalous sound generation unit generates a value obtained by approximating an acoustic feature following the probability distribution modeling the sound which includes normal sound and anomalous sound, calculates a degree of anomaly of the value that is generated, and calculates an output value obtained by inputting the value that is generated to the feature amount inverse transformation function when the degree of anomaly, the degree of anomaly being calculated, is greater than the threshold.

12. An anomalous sound detection training apparatus comprising:
processing circuitry configured to implement
a first function updating unit that updates a feature amount extraction function and a feature amount inverse transformation function, the feature amount extraction function and the feature amount inverse transformation function being input, based on an optimization index of a variational autoencoder;
an acoustic feature extraction unit that extracts an acoustic feature of normal sound based on training data for normal sound by using the feature amount extraction function that is input;
a normal sound model updating unit that updates a normal sound model by using the acoustic feature that is extracted;
a threshold updating unit that obtains a threshold $\phi_\rho$ corresponding to a false positive rate $\rho$, the false positive rate $\rho$ having a predetermined value, by using the training data for normal sound and the feature amount extraction function that is input;
a second function updating unit that updates the feature amount extraction function that is updated, based on a Neyman-Pearson-type optimization index defined by the threshold $\phi_\rho$ that is obtained, by using the acoustic feature of normal sound that is extracted and an acoustic feature of anomalous sound that is input; and
the processing circuitry being configured to perform processing of the first function updating unit, processing of the acoustic feature extraction unit, processing of the normal sound model updating unit, and processing of the second function updating unit repeatedly by using the feature amount extraction function, the feature amount extraction function being updated by the second function updating unit, as an input.

13. The anomalous sound detection training apparatus according to claim 12, further comprising:
an anomalous sound sampling unit that generates the acoustic feature of anomalous sound.

14. The anomalous sound detection training apparatus according to claim 13, wherein
the anomalous sound sampling unit generates the acoustic feature of anomalous sound by generating an acoustic feature $f_k^s$ of anomalous sound following Formula (23) below:

$$f_k^s \sim p(F(x)) - p(F(x)|z=0) \qquad (23)$$

when $p(F(x)|z \neq 0)$ is set as a probability distribution followed by anomalous sound, p(F(x)) is set as a probability distribution followed by sound which includes normal sound and anomalous sound, and p(F(x)|z=0) is set as a probability distribution followed by normal sound.

15. An anomalous signal detection apparatus that detects whether or not an input signal, the input signal being input, is an anomalous signal, the anomalous signal detection apparatus comprising:
processing circuitry configured to implement
a feature amount extraction unit that extracts a feature amount of the input signal by using a feature amount extraction function that is optimized based on probability distribution modeling signals which includes a normal signal and an anomalous signal, probability distribution modeling normal signals, and probability distribution modeling anomalous signals that are input;
a degree-of-anomaly calculation unit that calculates a degree of anomaly of the input signal by using the feature amount that is extracted; and
a determination unit that determines whether or not the input signal is an anomalous signal based on the degree of anomaly that is obtained and a threshold that is set by using degrees of anomaly obtained from the normal signal.

16. An anomalous signal detection training apparatus comprising:
processing circuitry configured to implement
a first function updating unit that updates a feature amount extraction function and a feature amount inverse transformation function, the feature amount extraction function and the feature amount inverse transformation function being input, based on an optimization index of a variational autoencoder;
a feature amount extraction unit that extracts a feature amount of a normal signal based on training data for normal signals by using the feature amount extraction function that is input;
a normal signal model updating unit that updates a normal signal model by using the feature amount that is extracted;
a threshold updating unit that obtains a threshold $\phi_\rho$ corresponding to a false positive rate $\rho$, the false positive rate $\rho$ having a predetermined value, by using the training data for normal signals and the feature amount extraction function that is input;
a second function updating unit that updates the feature amount extraction function that is updated, based on a Neyman-Pearson-type optimization index defined by the threshold $\phi_\rho$ that is obtained, by using the feature amount of a normal signal that is extracted and a feature amount of an anomalous signal that is input; and
the processing circuitry being configured to perform processing of the first function updating unit, processing of the feature amount extraction unit, processing of the normal signal model updating unit, and processing of the second function updating unit repeatedly by using the feature amount extraction function, the feature amount extraction function being updated by the second function updating unit, as an input.

17. An anomalous sound detection method for detecting whether or not input sound, the input sound being input, is anomalous sound, the anomalous sound detection method comprising:
an acoustic feature extraction step in which an acoustic feature extraction unit extracts an acoustic feature of the input sound by using a feature amount extraction function that is optimized based on probability distribution modeling sound which includes normal sound and anomalous sound, probability distribution modeling normal sound, and probability distribution modeling anomalous sound that is input;
a degree-of-anomaly calculation step in which a degree-of-anomaly calculation unit calculates a degree of anomaly of the input sound by using the acoustic feature that is extracted; and
a determination step in which a determination unit determines whether or not the input sound is anomalous sound based on the degree of anomaly that is obtained and a threshold that is set by using degrees of anomaly obtained from the normal sound.

18. An anomalous sound detection training method comprising:
a first function updating step in which a first function updating unit updates a feature amount extraction function and a feature amount inverse transformation function, the feature amount extraction function and the feature amount inverse transformation function being input, based on an optimization index of a variational autoencoder;
an acoustic feature extraction step in which an acoustic feature extraction unit extracts an acoustic feature of normal sound based on training data for normal sound by using the feature amount extraction function that is input;
a normal sound model updating step in which a normal sound model updating unit updates a normal sound model by using the acoustic feature that is extracted;
a threshold updating step in which a threshold updating unit obtains a threshold $\phi_\rho$ corresponding to a false positive rate $\rho$, the false positive rate $\rho$ having a predetermined value, by using the training data for normal sound and the feature amount extraction function that is input;
a second function updating step in which a second function updating unit updates at least one of the feature amount extraction function that is updated and the feature amount inverse transformation function that is updated, based on a Neyman-Pearson-type optimization index defined by the threshold $\phi_\rho$ that is obtained, by using the acoustic feature of normal sound that is extracted and an acoustic feature of anomalous sound that is input; and
processing of the first function updating step, processing of the acoustic feature extraction step, processing of the normal sound model updating step, and processing of the second function updating step are repeatedly performed by using the feature amount extraction function and the feature amount inverse transformation function, the feature amount extraction function and the feature amount inverse transformation function being updated by the first function updating step, as inputs.

19. An anomalous signal detection method for detecting whether or not an input signal, the input signal being input, is an anomalous signal, the anomalous signal detection method comprising:
a feature amount extraction step in which a feature amount extraction unit extracts a feature amount of the input signal by using a feature amount extraction function that is optimized based on probability distribution modeling signals which includes a normal signal and an anomalous signal, probability distribution modeling normal signals, and probability distribution modeling anomalous signals that are input;
a degree-of-anomaly calculation step in which a degree-of-anomaly calculation unit calculates a degree of anomaly of the input signal by using the feature amount that is extracted; and
a determination step in which a determination unit determines whether or not the input signal is an anomalous signal based on the degree of anomaly that is obtained and a threshold that is set by using degrees of anomaly obtained from the normal signal.

20. A non-transitory computer readable medium that stores a program for making a computer function as each unit of any of the apparatuses according to any one of claims 1, 9, 10, 12, 15 and 16.

\* \* \* \* \*